United States Patent
Sugiyama et al.

(10) Patent No.: US 6,939,645 B2
(45) Date of Patent: Sep. 6, 2005

(54) SEPARATOR FOR VALVE REGULATED LEAD ACID BATTERY AND VALVE REGULATED LEAD ACID BATTERY

(75) Inventors: Shoji Sugiyama, Osaka (JP); Atsushi Asada, Osaka (JP); Shuhei Nagakubo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/791,811

(22) Filed: Mar. 4, 2004

(65) Prior Publication Data

US 2004/0180265 A1 Sep. 16, 2004

Related U.S. Application Data

(63) Continuation of application No. PCT/JP02/09428, filed on Sep. 13, 2002.

(30) Foreign Application Priority Data

Sep. 21, 2001 (JP) .......................................... 2001-289325

(51) Int. Cl.⁷ ................................................. H01M 2/16
(52) U.S. Cl. ........................ 429/255; 429/251; 429/252
(58) Field of Search ................................. 429/251, 252, 429/255

(56) References Cited

U.S. PATENT DOCUMENTS

| | | | | |
|---|---|---|---|---|
| 4,216,281 A | * | 8/1980 | O'Rell et al. | 429/252 |
| 6,071,641 A | * | 6/2000 | Zguris | 429/144 |
| 6,706,450 B2 | * | 3/2004 | Asada | 429/251 |

FOREIGN PATENT DOCUMENTS

| | | |
|---|---|---|
| JP | 9-199100 | 7/1997 |
| JP | 11-250889 | 9/1999 |
| JP | 11-297293 | 10/1999 |
| JP | 2000-268796 | * 9/2000 |
| JP | 2001-84986 | 3/2001 |
| WO | WO 00/55930 | 9/2000 |

* cited by examiner

*Primary Examiner*—Patrick Joseph Ryan
*Assistant Examiner*—Thomas H. Parsons
(74) *Attorney, Agent, or Firm*—Manabu Kanesaka

(57) ABSTRACT

A separator for a valve regulated lead acid battery is composed mainly of fine glass fibers and also contains inorganic powder, beaten natural pulp, and heat-weldable organic fibers. The heat-weldable organic fibers have a fineness of 1.5 d (deniers) or less and a fiber length of 1 mm or more, and the amount of the heat-weldable organic fibers is from 3% to 15% by weight. A valve regulated lead acid battery employs the separator.

9 Claims, 4 Drawing Sheets

Fig. 1
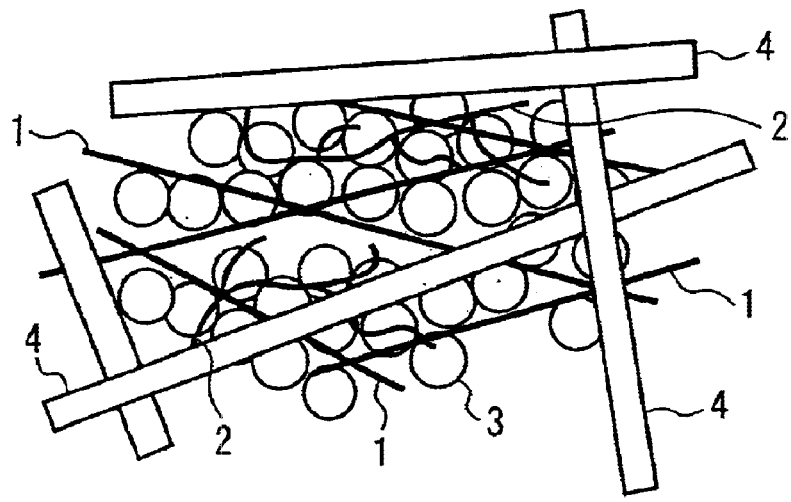
Fig. 2 Prior Art
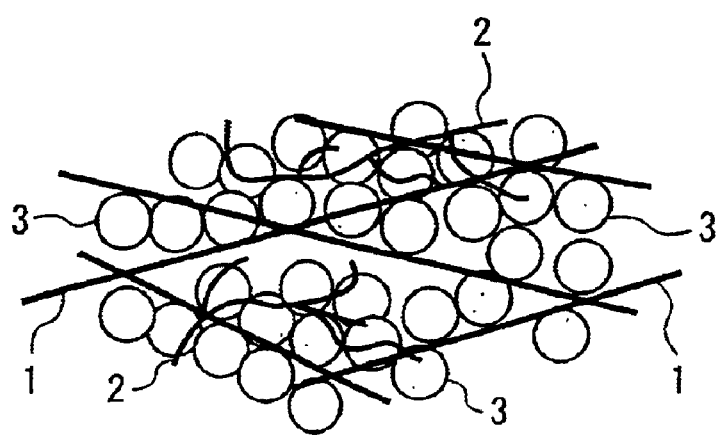

SEPARATOR FOR VALVE REGULATED LEAD ACID BATTERY AND VALVE REGULATED LEAD ACID BATTERY

CROSS REFERENCE TO RELATED APPLICATION

This is a continuation application of PCT/JP02/09428 filed on Sep. 13, 2002.

BACKGROUND OF THE INVENTION

The present invention relates to a separator for a valve regulated lead acid battery and a valve regulated lead acid battery employing the same.

A conventional separator for a valve regulated lead acid battery contains fine glass fibers as the main component. With such a separator containing fine glass fibers as the main component, a short circuit between a positive electrode plate and a negative electrode plate can be caused due to the mechanical cause I or the electrochemical cause II as follows:

I. Mechanical cause: When there is projection(s) (grids, granular balls of active material or the like) on either electrode plate, local pressure or shear force is applied to the separator by the projection(s). If the strength of the separator yields the given pressure or force, the separator is penetrated or ripped so that the projection comes in contact with the other electrode, thus causing the short circuit.

II. Electrochemical cause: As electrolyte becomes closer to pure water because sulfate ion in the electrolyte is consumed at the final stage of discharge, lead ion becomes more soluble so that lead sulfate generated on positive and negative electrodes dissolves partially. When the battery is charged after the generation of lead sulfate, the lead ion in the electrolyte is reduced at the negative electrode so that metallic lead is deposited. Therefore, dendrites are grown in the separator to reach the other electrode plate, thus causing the short circuit.

As a separator which can prevent such a short circuit from occurring due to the aforementioned causes, a separator has been proposed which is composed mainly of fine glass fibers and includes inorganic powder such as silica powder and natural pulp (JP2000-268796A, JP2001-185115A).

JP2000-268796A discloses a separator which is composed mainly of fine glass fibers (preferably, fine glass fiber having a mean fiber diameter of 1 $\mu$m or less) and includes from 5 to 30% by weight of inorganic powder (preferably silica particles having a specific surface area of 100 m$^2$/g or more) and from 3 to 20% by weight of beaten natural pulp (preferably, natural pulp having a Canadian freeness of 250 L or less). The density of the separator is equal to or more than 0.165g/cm$^3$.

Since the separator includes the inorganic powder such as silica, the separator has pores of small diameter and therefore has densified structure, thereby preventing an electrochemical short circuit from occurring due to the electrochemical cause II. Since the separator includes the beaten natural pulp, the separator has higher tensile strength and high punctual resistance, thereby preventing a mechanical short circuit from occurring due to the mechanical cause I.

A separator disclosed in JP2001-185115A is composed mainly of fine glass fibers and includes from 5% to 20% by weight of pulp and from 1% to 15% by weight of inorganic powder (preferably, silica powder) of which particle diameter is 50 pm or less. JP2001-185115A also discloses a valve regulated lead acid battery having the separator and electrode plates which are arranged to have an interval of 1.0 mm or less.

SUMMARY OF THE INVENTION

A separator for a valve regulated lead acid battery of the present invention is composed mainly of fine glass fibers and also contains inorganic powder, beaten natural pulp, and heat-weldable organic fibers. The heat-weldable organic fibers have a fineness of 1.5 d (deniers) or less and a fiber length of 1 mm or more, and the amount of the heat-weldable organic fibers is from 3% to 15% by weight.

A valve regulated lead acid battery of the present invention employs, as the separator thereof, a separator for a valve regulated lead acid battery of the present invention.

BRIEF DESCRIPTION OF THE DRAWINGS

FIG. 1 is a schematic view showing the structure of a separator for a valve regulated lead acid battery according to an embodiment of the present invention;

FIG. 2 is a schematic view showing the structure of a separator disclosed in JP2000-268796A;

FIGS. 3a, 3b, 3c, and 3d are illustrations for explaining the method of measuring the tearing strength of Examples and Comparative Examples, wherein FIGS. 3a, 3b, and 3d are plan views and FIG. 3c is a side view;

DESCRIPTION OF THE PREFERRED EMBODIMENTS

Figure 3A:
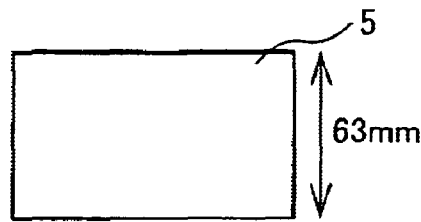

A separator for a valve regulated lead acid battery of the present invention is composed mainly of fine glass fibers and includes inorganic powder, beaten natural pulp, and heat-weldable organic fibers of which fineness is 1.5 d or less and fiber length is 1 mm or more.

The fine glass fibers are preferably acid resistant glass fibers, more preferably alkali-contained glass fibers. The fine glass fibers preferably have a mean fiber diameter of 1.5 $\mu$m or less, more preferably of 1 $\mu$m. The separator includes the fine glass fibers preferably in a range of from 50 to 92% by weight. The fine glass fibers of which mean fiber diameter is 1.5 $\mu$m or less improves the absorpness and facilitates the sheet formation of the separator by the papermaking process. The fine glass fibers in an amount of 50% by weight or more improve the absorpness of the separator.

Silica, titanium dioxide and diatomaceous earth can be used as the inorganic powder. Silica powder having a specific surface area of 100 m$^2$/g or more is most suitable because the silica powder has many pores in its particles and the surfaces thereof so as to have high hydrophilic property, thereby giving enough absorpness of the electrolyte to the separator. The inorganic powder contained in the separator preferably in an amount of from 5% to 30% by weight prevents a short circuit from occurring due to the aforementioned electrochemical cause II of the separator.

Among the natural pulp, it is suitable to use softwood pulp beaten by a beater or the like. The softwood pulp has long fiber length and is homogeneous so that it can be very effective in reinforcing the separator. The softwood pulp is preferably beaten to the extent of 250 mL or less, more preferably 150 mL or less, in the Canadian freeness (the Canadian standard freeness) at a concentration of 0.3% by weight. It should be noted that the freeness of unbeaten natural pulp is 600 mL or more. The beaten natural pulp beaten has a very large specific surface area and pore volume, several times as large as those of ordinary pulp do. It further has good reactivity, hydrophilic property, absorpness and acid resistance and still can be very effective in reinforcing the separator. Consequently, the beaten natural pulp contained in the separator preferably in an amount of from 2% to 15% by weight can significantly improve the strength and hardness of the separator and cannot ruin the absorpness and wicking property of the separator.

When the separator includes beaten natural pulp of less than 2% by weight, enough effect of preventing a short circuit can not be obtained. While, when the amount of beaten natural pulp exceeds 15% by weight, the separator becomes too hard to maintain the adhesion with electrode plates. Therefore, beaten natural pulp is preferably included in the separator in an amount of from 2% to 15% by weight.

The beaten natural pulp may be partially substituted by fibrillated cellulose. The fibrillated cellulose is natural pulp finely divided into the size of microfibril and effective to improve mechanical strength of the separator. When the amount of fibrillated cellulose exceeds 5% by weight, the separator becomes too hard to maintain its adhesion with the electrode plates. Therefore, the amount of the fibrillated cellulose should be not greater than 5% by weight and the total amount of fibrillated cellulose and beaten natural pulp should not exceed 15% by weight.

Preferably employed as the heat-weldable organic fibers are polyester fibers, polyethylene fibers, polypropylene fibers, acrylic fibers which are excellent in acid resistance and weldability. Among these, surface denatured polyester fibers of which surfaces are denatured to be molten at a lower temperature are particularly preferable in terms of the welding workability and the homogeneity of the separator.

Since the number of fibers must be insufficient when the fineness of heat-weldable organic fibers exceeds 1.5 d, heat-weldable organic fibers of which fineness is 1.5 d or less are used. It is hard to deal with organic fibers having a fineness of 0.5 d or less and such organic fibers are hardly uniformly dispersed during the papermaking process. Therefore, the fineness of the heat-weldable organic fibers is preferably from 0.5 d to 1.5 d.

Since the effect of improving the strength and workability by tangles of organic fibers should be insufficient when the fiber length of heat-weldable organic fibers is less than 1 mm, the length of heat-weldable organic fibers is preferably 1 mm or more, more preferably 3 mm or more. The fiber length of organic fibers is preferably 10 mm or less, more preferably 5 mm or less.

The separator containing the heat-weldable organic fibers in an amount of from 3% to 15% by weight, preferably from 3% to 10% by weight has high strength and excellent workability.

The separator for a valve regulated lead acid battery of the present invention is produced by mixing the above compositions, and, then, making a sheet of the mixture in the papermaking method.

The density of the separator is preferably from 0.15 to 0.18 g/cm$^3$. The density of 0.15 g/cm$^3$ or more reduces the size of spaces in the separator so as to prevent a short circuit of the battery effectively even when the separator is thin to be used for flat electrode plates. The density of 0.2 g/cm$^3$ or less gives sufficient absorpness to the separator. The thickness (the thickness according to the measuring method used in Examples as will be described later) of the separator of the present invention is preferably from 0.3 mm to 2.0 mm.

The separator for a valve regulated lead acid battery of the present invention may contain components other than the fine glass fibers, the inorganic powder, the natural pulp, and the heat-weldable organic fibers mentioned above in such an amount not to lose the purpose of the present invention.

The valve regulated lead acid battery of the present invention is manufactured using the separator of the present invention in the ordinary method. For example, a positive electrode plate, the separator, and a negative electrode are laminated in this order and the laminated body thus obtained is compressed in the laminating direction and is loaded in a battery case. Then, the battery case is closed with a lid, thereby assembling a valve regulated lead acid battery. Sulfuric acid solution is flooded into the battery case.

The separator for a valve regulated lead acid battery of the present invention prevents an electrochemical short circuit and mechanical short circuit according to the similar mechanism of the mentioned-above separator disclosed in JP2000-268796A by mixing the inorganic powder and beaten natural pulp in the fine glass fibers. Further, the separator has improved durability against repeated folding, tearing strength, and workability into envelope-shape without impairing the aforementioned property of preventing a short circuit by mixing the heat-weldable organic fibers, of which fineness is 1.5 or less and fiber length is 1 mm or more, in the predetermined amount.

Hereinafter, the improving mechanism by the heat-weldable organic fibers will be described with reference to FIG. 1 which is a schematic view showing the structure of a separator for a valve regulated lead acid battery according to an embodiment of the present invention and FIG. 2 which is a schematic view showing the structure of the separator disclosed in JP2000-268796A. It should be noted that FIG. 1 is a schematic representation and is not intended to limit the separator of the present invention. FIG. 1 must be used for helping persons skilled in the art to understand the structure of the present invention. The diameters and lengths of fibers, the diameters of particles, the adding amounts, and the sizes of spaces are not used for limiting the present invention.

As shown in FIG. 2, the sheet strength of the separator disclosed in JP2000-268796A is achieved by tangles of fine glass fibers 1 and the beaten natural pulp 2. Inorganic powder 3 exists among the fibers 1, 2 and there are portions where the density of fibers 1 and 2 is low. The separator is easily broken at such low density portion. Since the separator has no fibers as backbones, the separator is strong against downward forces but very weak against folding and lateral force (tearing).

On the other hand, the separator according to an embodiment of the present invention further contains heat-weldable organic fibers 4 as backbones, which are long and thin and has excellent flexibility, in addition to the fine glass fiber 1, the beaten natural pulp 2, and the inorganic powder 3 as shown in FIG. 1. Therefore, the separator is given enough folding endurance and tearing strength. Further, since the fine glass fibers 1, the natural pulp 2 and the inorganic powder 3 are welded with the heat-weldable organic fibers 4, the separator is entirely given enough high mechanical strength.

Particularly, by using thin and long heat-weldable organic fibers 4 having a fineness of 1.5 d or less and a fiber length of 1 mm or more, the number of contained heat-weldable organic fibers 4 is increased, thus increasing the number of contacts among the heat-weldable organic fibers. Therefore, the folding endurance and tearing strength are sufficiently improved. The increase in number of the heat-weldable organic fibers 4 also increases the possibility of getting the heat-weldable organic fibers to be in contact with each other during folding and pressure bonding, thereby facilitating the work of producing an envelope-like separator and thus securely preventing a short circuit from occurring at sides.

Since the heat-weldable organic fibers of which fineness is 1.5 d or less are employed in the present invention, the number of the organic fibers can be significantly increased so that the number of contacts among the heat-weldable organic fibers is increased. Therefore, the effect of increasing the aforementioned strength and the effect of increasing the workability of making envelope-like separator can be effectively exhibited.

Fineness 1 d represents a fiber of which weight is 1 g when the length is 9000 m. The fiber diameter is measured by $11.9 \times (d:denier/\rho:$ absolute specific gravity$)^{0.5}$. For example, in case of polyester fibers having an absolute specific gravity of 1.3, the fiber diameter is about 21 $\mu$m when the fineness is 4 d, is 10 $\mu$m when the fineness is 1 d, and is 12.5 $\mu$m when the fineness is 1.5 d.

The number of the contained heat-weldable organic fibers of 1.5 d or less and being relatively short is higher than that of organic fibers of 4 d by three times in the same weight. The smaller the fineness is, the larger the number of fibers to be contained is. Therefore, the contained heat-weldable organic fibers of 1.5 d or less and being relatively short provide the effect of improving the aforementioned strength and the effect of improving the workability into an envelope shape even in a amount smaller than that in case using organic fibers of 4 d.

Since 1 d=1/9Tex, the fineness of 1.5 d or less is equal to 0.17 Tex or less.

In the separator disclosed in JP2000-268796A, the density of the separator is set to be 0.165 g/cm$^3$ or more in order to obatain the property capable of preventing a mechanical short circuit. In the present invention, however, the absolute specific gravity of material can be minimized by the addition of the heat-weldable organic fibers, thereby obtaining the property capable of preventing a mechanical short circuit even with a relatively low density about 0.145 g/cm$^3$.

EXAMPLES AND COMPARATIVE EXAMPLES

Hereinafter, the present invention will be described in more detail with reference to Examples and Comparative Examples. However, the present invention is not limited to the following Examples.

Materials used in the examples and comparative examples are given below.

Glass fiber: alkali-containing glass fiber having a mean fiber diameter of 0.8 $\mu$m.

Silica Powder: silica powder having a specific surface area of about 200 m$^2$/g.

Beaten natural pulp: soft wood pulp beaten to the extent of about 150 mL in the Canadian freeness.

Heat-weldable organic fiber of 1.5 d: surface denatured polyester fiber having a fineness of 1.5 d and a fiber length of 3 mm.

Heat-weldable organic fiber of 4.0 d: surface denatured polyester fiber having a fineness of 4.0 d and a fiber length of 10 mm.

Examples 1 and 3, and Comparative Examples 1–6

Figure 6:
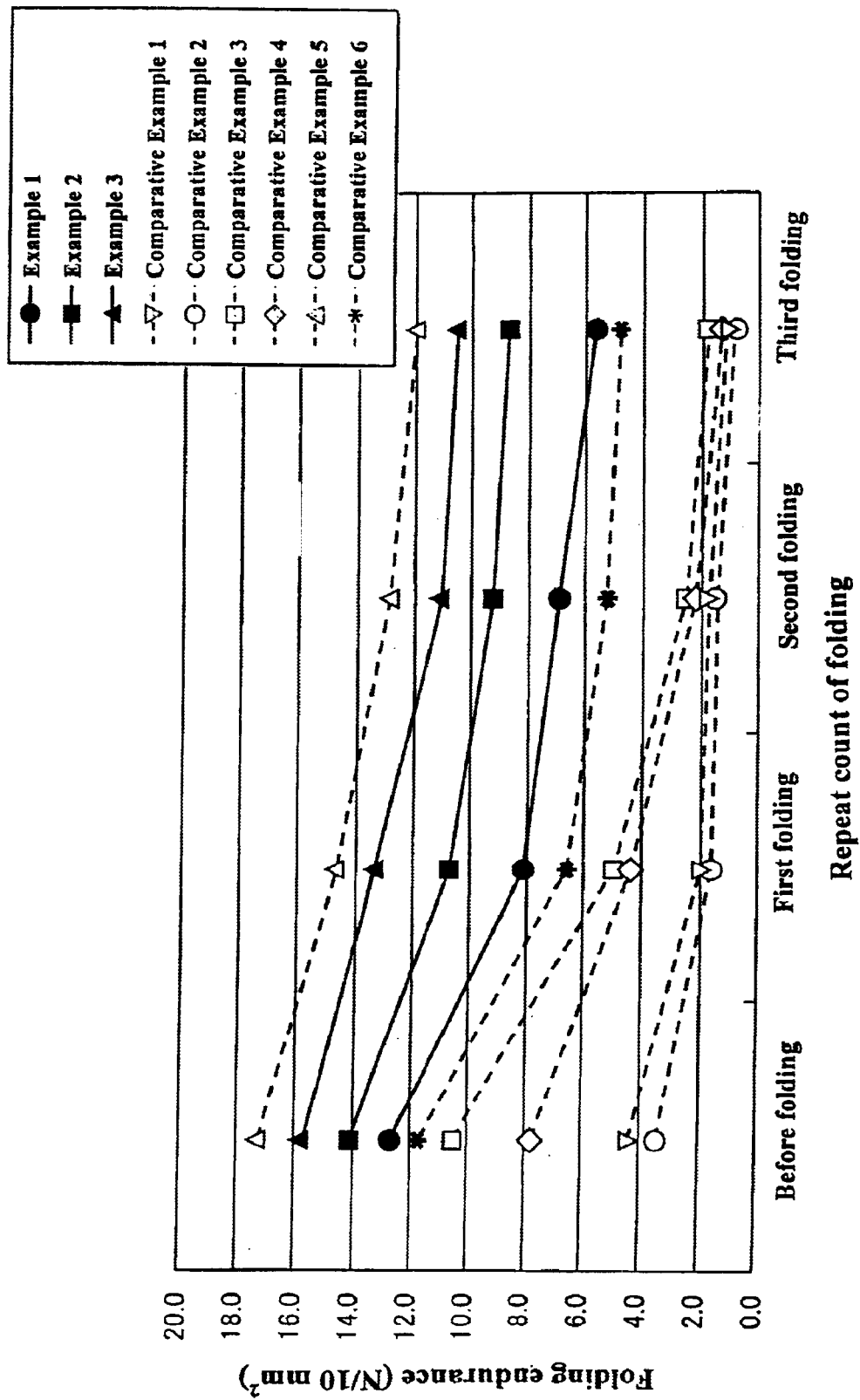
FIG. 6 is a graph showing results of measurement of folding endurance.

Samples of separators for sealed lead acid batteries were prepared with compositions given in Table 1. Measurement results of characteristics of the samples are given in Table 1. The measurement results of folding endurance are shown in a graph of FIG. 6.

The methods of measuring the respective characteristics are as follows.

[Thickness [mm] and Density [g/cm$^3$]]

Thickness T (SBA4501) of each sample was measured under a pressure of 2 N/cm$^2$ applied through the thickness thereof. Density of each sample was calculated by the formula W/(T×S), where T is a thickness measured as the above, W is mass measured by an electronic balance, and S is an area of each sample.

[Tensile Strength [N/10 mm$^2$]]

Tensile strength of each sample was measured according to SBA4501. Relative value was also obtained in comparison to that of the ordinary material (Comparative Example 1) as 100.

[Punctual Resistance]

A needle, of which diameter was 1 mm and tip was spherical, was pressed to a fixed sample at a speed of 120 mm/min in a direction perpendicular to the fixed sample. A maximum load applied to the needle at the moment when the needle penetrated the sample was measured. Since the measured load is amenable to a slight difference in shapes of needle tips, the measured load is indicated as a relative value which is obtained in comparison to the measured load of the ordinary material (Comparative Example 1) as 100. The value is a barometer of the occurrence of mechanical short circuit. The larger the value is, the greater the effect of preventing a mechanical short-circuit is.

[Tearing Strength]

Figure 3B:
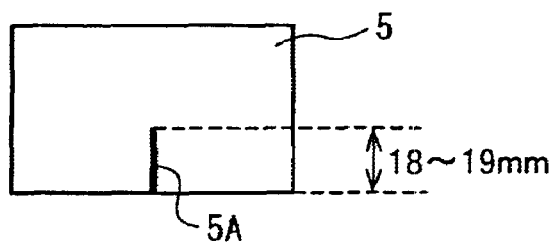
Figure 3C:
Figure 3D:
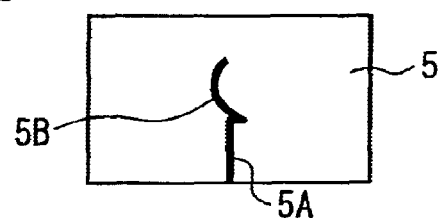

Tearing strength of each sample 5 was measured by the method shown in FIGS. 3a–3d. That is, the sample 5 was cut into a shape of 63 mm×75 mm wherein the direction to be measured for tearing strength is set to be the direction having 75 mm (FIG. 3a) and a cut 5A of about 1/3 of the entire length (63 mm/3=18–19 mm) was made in the sample 5 in the direction perpendicular to the direction to be measured (FIG. 3b). Then, the sample 5 was torn from one side about the cut 5A (numeral 5B designates a torn portion) as shown in FIGS. 3c, 3d and the value of resistance during this was measured by "ELMENDORF TEARING TESTER" available from Toyo Seiki Seisaku-sho, Ltd. A relative value was also obtained in comparison to that of the ordinary material (Comparative Example 1) as 100.

[Folding Endurance (N/10 mm$^2$)]

Figure 5A:
FIGS. 5a–5f are front views for explaining the method of measuring the folding endurance of Examples and Comparative Examples.
Figure 5B:
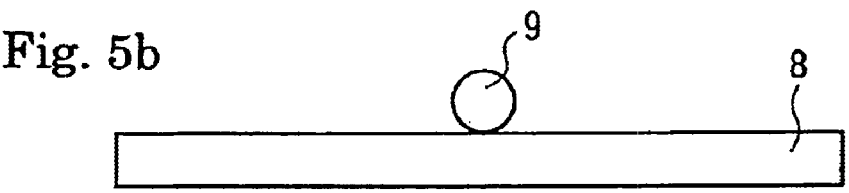
Figure 5C:
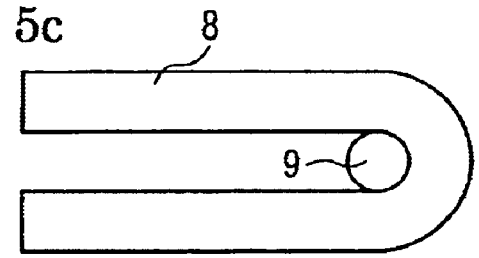
Figure 5D:
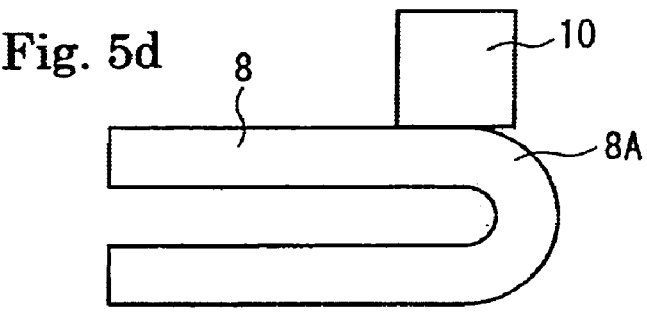
Figure 5E:
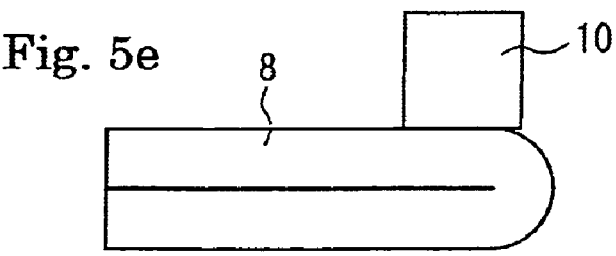
Figure 5F:
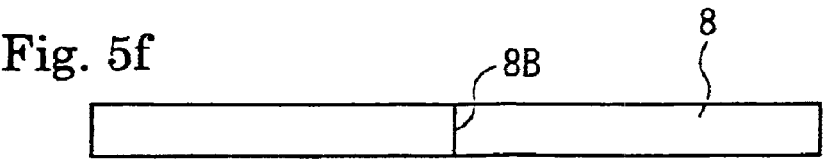

Folding endurance of each sample was measured by the method shown in FIGS. 5a–5f. That is, a sample 8 was cut into a shape of 25 mm×150 mm (FIG. 5a) and was bent along a metallic rod 9 of 4.5 mm diameter at the middle in the longitudinal direction (FIGS. 5b, 5c). Then, the metallic rod 9 is removed and a weight 10 of 2 kg is put on the bent portion 8A of the sample 8 for 5 seconds to form a crease 8B (FIGS. 5d, 5e). After the sample 8 was stretched (flattened), the tensile strength of the sample was measured by a tensile tester (available from Imada Seisaku-sho K. K.). On the first folding, a crease was formed on a surface which was a net side during papermaking. On the second folding, another crease was formed on the other side by folding the sample in the opposite direction. The folding direction was changed alternatively for every folding. The tensile strength was measured after every folding.

As for the folding endurance after the second folding, a relative value was also obtained in comparison to that of the ordinary material (Comparative Example 1) as 100. The decreasing rate in folding endurance was calculated as follows. That is, the strength after the second folding was subtracted from the strength before folding to obtain a difference and the difference was divided by the strength before folding, thereby obtaining the decreasing rate.

[Short-Circuit Proofness at Constant Voltage]

A sample separator of 0.5 mm in thickness was sandwiched between two flat lead electrode plates (of which electrode area was 7 mm$^2$), and they were soaked into a saturated solution of lead sulfate. Then, a constant voltage of 10 V was applied to the sample under 2.9 N/m$^2$ of pressure. When metallic lead which grew from the negative electrode plate reached the positive electrode plate, electrical resistance between the electrode plates dropped remarkably. The elapsed time from applying the voltage to the remarkable drop of the resistance was measured and the measured time was divided by the thickness of the separator. The value thus obtained of each example is indicated as a relative value which is obtained in comparison to that of the ordinary material (Comparative Example 1) as 100. The value is a barometer for electrochemical short circuit. The larger the value is, the greater the effect of preventing an electrochemical short-circuit is.

[Absorpness (%)]

Each sample was cut into a shape of 70 mm×70 mm. After the weight "a" of the cut sample was measured, the sample was immersed into water for 60 minutes. Then, the sample was taken out of the water and was suspended vertically. After the sample was left until no water dropped, the weight "b" of the sample was measured again. The percentage of water content (%)=(b−a)/b×100 was calculated from the measured weight "a" before immersed into water and the measured weight "b" after immersed into water. The percentage of water content was the absorpness. The absorpness is a barometer of the absorpness of the separator. The larger the value is, the greater the absorpness is.

[Wicking Property (mm/min)]

Wicking property of each sample was measured by immersing the bottom of the sample vertically into a dilute solution of sulfuric acid having a specific gravity of 1.30 and measuring a rise of the solution soaking into the sample in one minute after immersed.

[Seal Strength (g/mm)]

Figure 4:
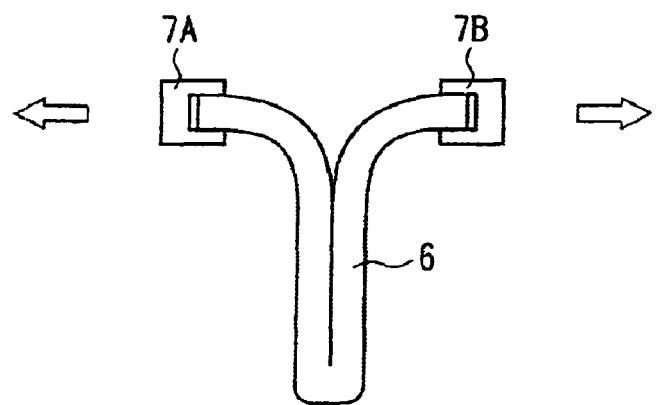
FIG. 4 is a front view for explaining the method of measuring the seal strength of Examples and Comparative Examples.

Each sample was cut into a shape of 25 mm×25 mm and was bent into two so that one is lapped on the other one. The side edges of the lapped sample are sealed with heat for 1 mm in width so as to form the sample 6 into an envelope shape. As shown in FIG. 4, the value of resistance when upper portions of an opening of the sample 6 were pulled by jigs 7A and 7B was measured by the aforementioned tensile tester. The seal strength required for assembling a normal battery is 100 g/mm or more. Separator with a seal strength lower than 100 g/mm is unusable.

TABLE 1

| | | Example | | | Comparative Example | | | | | |
|---|---|---|---|---|---|---|---|---|---|---|
| Examples | | 1 | 2 | 3 | 1 | 2 | 3 | 4 | 5 | 6 |
| Compositions (% by weight) | Fine glass fiber | 80 | 75 | 70 | 100 | 75 | 80 | 83 | 65 | 70 |
| | Beaten natural pulp | 5 | 5 | 5 | — | — | 10 | 5 | 5 | 10 |
| | Inorganic powder | 10 | 10 | 10 | — | 20 | 10 | 10 | 10 | 10 |
| | Heat-weldable organic fiber of 1.5d | 5 | 10 | 15 | — | — | — | 2 | 20 | — |
| | Heat-weldable organic fiber of 4.0d | — | — | — | — | 5 | — | — | — | 10 |
| Measurement Results | Thickness (mm) | 1.0 | 1.0 | 0.9 | 1.0 | 1.1 | 1.0 | 1.0 | 1.1 | 1.0 |
| | Density (g/cm$^3$) | 0.163 | 0.157 | 0.151 | 0.140 | 0.200 | 0.173 | 0.165 | 0.147 | 0.175 |
| | Tensile strength Measured value (N/10 mm$^2$) | 13.4 | 15.0 | 16.3 | 4.3 | 2.7 | 8.6 | 7.6 | 17.8 | 14.8 |
| | Relative value (%) | 312 | 349 | 379 | 100 | 63 | 200 | 177 | 414 | 344 |
| | Punctual resistance Relative value (%) | 200 | 210 | 230 | 100 | 70 | 190 | 120 | 255 | 200 |
| | Tearing strength Measured value (g/mm) | 124 | 149 | 174 | 74 | 67 | 86 | 88 | 208 | 118 |
| | Relative value (%) | 168 | 201 | 235 | 100 | 91 | 116 | 119 | 281 | 159 |
| | Folding endurance Measured value (N/10 mm$^2$) Before folding | 12.7 | 14.2 | 15.7 | 4.3 | 3.5 | 10.6 | 7.8 | 17.3 | 11.8 |
| | After first folding | 8.1 | 10.7 | 13.3 | 1.9 | 1.6 | 4.9 | 4.3 | 14.7 | 6.5 |
| | After second folding | 6.8 | 9.2 | 11.0 | 1.7 | 1.4 | 2.4 | 2.1 | 12.8 | 5.2 |
| | After third folding | 5.6 | 8.6 | 10.5 | 1.0 | 1.0 | 1.8 | 1.2 | 11.8 | 4.8 |
| | Relative value of folding endurance after second folding (%) | 410 | 554 | 663 | 100 | 83 | 145 | 127 | 771 | 313 |
| | Decreasing rate in folding endurance (%) | 46 | 35 | 30 | 61 | 61 | 77 | 73 | 26 | 56 |
| | Relative value of short-circuit proofness at constant voltage (%) | 4300 | 4400 | 4200 | 100 | 1600 | 4500 | 4400 | 3600 | 1500 |
| | Absorpness (%) | 85 | 84 | 83 | 92 | 84 | 85 | 85 | 76 | 80 |
| | Wicking property (mm/min) | 46 | 43 | 40 | 50 | 40 | 50 | 48 | 32 | 45 |
| | Seal strength (g/mm) | 147 | 338 | 652 | 0 | 0 | 0 | 27 | 934 | 83 |

The followings are apparent from Table 1.

Comparative Example 1 composed only of glass fibers has low punctual resistance and poor short-circuit proofness at constant voltage. Further, Comparative Example 1 is insufficient in tensile strength, tearing strength, and folding endurance. Comparative Example 2 composed of glass fibers, silica powder, and organic fibers has improved short-circuit proofness at constant voltage, but has quite poor strength against penetration. Further, the tensile strength, the folding endurance, and the tearing strength of Comparative Example 2 are poorer than those of Comparative Example 1. Comparative Example 3 is an example of JP2000-268796A and contains glass fibers, silica powder, and natural pulp. The strength against penetration, the short-circuit proofness at constant voltage, and the tensile strength of Comparative Example 3 are good, but its tearing strength and its folding endurance may not be sufficient. Any of Comparative Examples 1 through 3 is poor in sealing property and is thus impossible to be sealed with heat.

Though Comparative Example 4 contains glass fibers, silica powder, natural pulp, and organic fibers of 1.5 d, the content of the organic fibers was low as 2% by weight so that the effect of improving the folding endurance was not sufficiently obtained and the sealing property was not obtained. Comparative Example 5 in which the content of organic fibers was high as 20% by weight has high folding endurance and well sealing property. However, the absorpness (absorpness) and the wicking property as the necessary characteristics as separator were impaired. Though Comparative Example 6 contains organic fibers, the organic fibers were thick as 4.0 d so that the entire pore diameter was so large to reduce the short-circuit proofness at constant voltage and impair the sealing property. Comparative Example 6 has seal strength less than 100 g/mm which value is a practical level.

On the other hand, each separator of Examples 1 through 3, which contains glass fibers, natural pulp, silica powder, and organic fibers of 1.5 d in amounts within the ranges of present invention, is excellent in strength against penetration and in short-circuit proofness at constant voltage and also well in any of tensile strength, in tearing strength, and in folding endurance, in addition to excellent absorpness and wicking property. Each separator of Examples 1 through 3 is also excellent in sealing property and has enough seal strength.

Industrial Applicability

As detailed above, the present invention can provide a separator for a valve regulated lead acid battery in which a short circuit between a positive electrode plate and a negative electrode plate of the valve regulated lead acid battery hardly occurs and which is excellent in folding endurance, in durability against repetition of folding, and in tearing strength, and allows easy formation of envelope-like separator. The separator of the present invention is a high short-circuit-proof separator having enough folding endurance into a U-shape surrounding an electrode plate and other folding or bending, having good workability when assembling a battery, and having no problem of occurrence of a short circuit at the sides thereof. According to the valve regulated lead acid battery of the present invention employing the separator for a valve regulated lead acid battery of the present invention, a valve regulated lead acid battery can be provided which has high power, high capacity, and longer service life and is excellent in stability of battery performance.

What we claim is:

1. A separator for a valve regulated lead acid battery, comprising:

fine glass fibers comprising acid resistant glass fibers and contained in a range of 50 to 92% by weight, inorganic powder, beaten natural pulp, and heat-weldable organic fibers for welding the fine glass fibers, the inorganic powder, and the beaten natural pulp together, wherein the heat-weldable organic fibers have a fineness of 1.5 d (deniers) or less and a fiber length of 1 mm or more, and the amount of the heat-weldable organic fibers is from 3% to 15% by weight, and wherein said separator is bendable and has folding endurance of 6.8 N/10 mm$^2$ or greater at a second folding.

2. A separator for a valve regulated lead acid battery as claimed in claim 1, wherein the amount of the inorganic powder is from 5% to 30% by weight and the amount of the natural pulp is from 2% to 15% by weight.

3. A separator for a valve regulated lead acid battery as claimed in claim 1, wherein the fine glass fiber has a mean fiber diameter of 2.0 $\mu$m or less.

4. A separator for a valve regulated lead acid battery as claimed in claim 1, wherein the inorganic powder is a silica powder having a specific surface area of 100 m$^2$/g or more.

5. A separator for a valve regulated lead acid battery as claimed in claim 1, wherein the natural pulp is beaten to the extent of 250 mL or less in the Canadian freeness.

6. A separator for a valve regulated lead acid battery as claimed in claim 1, wherein weldable organic fibers have a fineness from 0.5 d to 1.5 d and the heat-weldable organic fibers have a length from 1 mm to 10 mm.

7. A separator for a valve regulated lead acid battery as claimed in claim 1, wherein the separator has a density from 0.15 g/cm$^3$ to 0.18 g/cm$^3$.

8. A valve regulated lead acid battery including the separator for a valve regulated lead acid battery as claimed in claim 1.

9. A separator for a valve regulated lead acid battery as claimed in claim 1, wherein said separator has a folding endurance at a first time in a range from 8.1 to 13.3 N/10 mm$^2$, and said folding endurance at the second folding is in a range from 6.8 to 11.0 N/10 mm$^2$.

* * * * *